(12) United States Patent
Park et al.

(10) Patent No.: US 11,598,788 B2
(45) Date of Patent: Mar. 7, 2023

(54) MEASURING METHOD FOR MEASURING HEAT DISTRIBUTION OF SPECIFIC SPACE USING STHM PROBE, METHOD AND DEVICE FOR DETECTING BEAM SPOT OF LIGHT SOURCE

(71) Applicant: PARK SYSTEMS CORP., Suwon-si (KR)

(72) Inventors: Sang-il Park, Suwon-si (KR); Byoung-Woon Ahn, Suwon-si (KR); Ahjin Jo, Seoul (KR); Soobong Choi, Incheon (KR)

(73) Assignee: PARK SYSTEMS CORP., Suwon-si (KR)

( * ) Notice: Subject to any disclaimer, the term of this patent is extended or adjusted under 35 U.S.C. 154(b) by 0 days.

(21) Appl. No.: 17/335,094

(22) Filed: Jun. 1, 2021

(65) Prior Publication Data

US 2021/0373046 A1 Dec. 2, 2021

(30) Foreign Application Priority Data

Jun. 2, 2020 (KR) .......................... 10-2020-0066191

(51) Int. Cl.
*G01Q 60/58* (2010.01)
*G01K 3/00* (2006.01)
*G01K 13/00* (2021.01)

(52) U.S. Cl.
CPC ............... *G01Q 60/58* (2013.01); *G01K 3/00* (2013.01); *G01K 13/00* (2013.01)

(58) Field of Classification Search
CPC ...................................................... G01Q 60/58
See application file for complete search history.

(56) References Cited

U.S. PATENT DOCUMENTS

| 2004/0202226 | A1  | 10/2004 | Gianchandani et al. | |
|---|---|---|---|---|
| 2012/0260374 | A1* | 10/2012 | Mcconney | B82Y 35/00 850/1 |
| 2013/0061357 | A1* | 3/2013 | Watanabe | B82Y 35/00 850/56 |

(Continued)

FOREIGN PATENT DOCUMENTS

| JP | H02287246 A | 11/1990 |
|---|---|---|
| JP | 2002131211 A | 5/2002 |

(Continued)

*Primary Examiner* — Eliza W Osenbaugh-Stewart
(74) *Attorney, Agent, or Firm* — Invenstone Patent, LLC

(57) ABSTRACT

The present disclosure provides a measuring method for measuring heat distribution of a specific space using an SThM probe, and a method and device for detecting a beam spot of a light source.

The method according to an embodiment of the present disclosure is the measuring method for measuring heat distribution of a specific space, the measuring method includes: linearly moving a SThM probe that may measure a temperature change in the specific space; and calculating heat distribution of the specific space using continuous temperature change values obtained from the SThM probe during the moving step.

According to the measuring method, and the method and device for detecting a beam spot of a light source, it is possible to map temperature distribution in a small space using a SThM probe and it is possible to accurately detect a beam spot using the temperature distribution.

3 Claims, 5 Drawing Sheets

(56) References Cited

U.S. PATENT DOCUMENTS

2017/0059609 A1\* 3/2017 Watanabe .............. G01Q 20/02
2018/0203040 A1\* 7/2018 Sadeghian Marnani ....................
                                                         G01Q 60/58

FOREIGN PATENT DOCUMENTS

| JP | 2015-155847 | 8/2015 |
| JP | 2017-049087 | 3/2017 |
| KR | 10-2018-0030684 | 3/2018 |

\* cited by examiner

MEASURING METHOD FOR MEASURING HEAT DISTRIBUTION OF SPECIFIC SPACE USING STHM PROBE, METHOD AND DEVICE FOR DETECTING BEAM SPOT OF LIGHT SOURCE

CROSS-REFERENCE TO RELATED APPLICATIONS

This application claims the priority of Korean Patent Application No. 10-2020-0066191 filed on Jun. 2, 2020, in the Korean Intellectual Property Office, the disclosure of which is incorporated herein by reference.

BACKGROUND

Field

The present disclosure relates to a measuring method for measuring heat distribution of a specific space using a SThM probe, and a method and device for detecting a beam spot of a light source.

Description of the Related Art

A Scanning Probe Microscope (SPM) is a microscope that measures and shows surface characteristic of a specimen in a 3D image by moving a fine probe, which is manufactured through a MEMS process, and the like, over scanning the surface of the specimen. Such an SPM may be subdivided into an Atomic Force Microscope (AFM), a Scanning Tunneling Microscope (STM), etc. in accordance with the measurement method.

An AFM measures a specimen surface by measuring inter-atom interactive force that is generated when a tip formed on a side of a cantilever is moved close to the specimen surface. However, other forces may act at the tip other than the inter-atom interactive force between the specimen and the tip end. For example, when the tip is magnetized, the magnetism of the specimen may apply force to the tip and the magnetic characteristic of the specimen may also be measured. This is called a measurement method that is called Magnetic Force Microscopy (MFM). Further, application modes that may measure the characteristics of various specimen surfaces using various kinds of tips have been developed, and Electric Force Microscopy (EFM), Scanning Tunneling Microscopy (SCM), etc. may be exemplified.

In various application modes of an AFM, the application mode that measures a temperature change of a specimen surface (which is called TCM) or measure thermal conductivity of a specimen surface (which is called CCM) is called Scanning Thermal Microscopy (SThM).

In general, a scanning thermal microscopy has been used to measure a temperature change and thermal conductivity of a specimen surface.

SUMMARY

The present disclosure has been made in an effort to solve the problems described above and an object of the present disclosure is to provide a measuring method for measuring heat distribution of a specific space using a SThM probe, and a method and device for detecting a beam spot of a light source.

The objects of the present disclosure are not limited to the objects described above and other objects will be clearly understood by those skilled in the art from the following description.

In order to achieve the objects, a method according to an embodiment of the present disclosure is a measuring method for measuring heat distribution of a specific space, the measuring method includes: linearly moving a SThM probe that may measure a temperature change in the specific space; and calculating heat distribution of the specific space using continuous temperature change values obtained from the SThM probe during the moving step.

In order to achieve the objects, a method according to an embodiment of the present disclosure is a method of detecting a beam spot of a light source, the method includes: emitting light in a first direction by means of the light source such that the beam spot is formed; positioning a SThM probe such that the end of a probe is positioned at a surrounding portion where the beam spot is formed while facing a direction substantially opposite to the first direction; measuring a temperature change value while moving the SThM probe in a direction substantially perpendicular to the first direction; and detecting the beam spot from the measured temperature change value.

In order to achieve the objects, a device for detecting a beam spot of a light source according to an embodiment of the present disclosure includes: an optical system including a light source and configured such that light from the light source forms a beam spot at a specific point; a SThM probe disposed such that the end of a probe faces a direction substantially opposite to a traveling direction of the light from the light source; a moving unit configured to be able to move the SThM probe; and a control device controlling movement of the moving unit and calculating a temperature change on a route of the SThM probe on the basis of information from the SThM probe.

According to another aspect of the present disclosure, a CCD camera is further included such that the shape of the beam spot may be visually recognized.

According to the measuring method for measuring heat distribution of a specific space using a SThM probe, and the method and device for detecting a beam spot of a light source, it is possible to map temperature distribution in a small space using a SThM probe and it is possible to accurately detect a beam spot using the temperature distribution.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

The advantages and features of the present disclosure, and methods of achieving them will be clear by referring to the exemplary embodiments that will be describe hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims.

Although terms 'first', 'second', etc. are used to describe various components, it should be noted that these components are not limited by the terms. These terms are used only for discriminating a component from another component. Accordingly, it should be noted that a first component that is stated below may be a second component within the spirit of the present disclosure. Further, if it is described that second coating is performed after first coating, performing coating in the opposite order is also included in the spirit of the present disclosure.

When reference numerals are used herein, the same reference numerals are used, if possible, when the same components are shown even in different drawings.

The size and thickness of each component shown in the drawings are shown for the convenience of description and the present disclosure is not necessarily limited to the sizes and thicknesses of the shown components.

A method and device according to an embodiment of the present disclosure does not need to use an AFM or employ some components of an AFM. However, since the method and device of the present disclosure may be achieved using the components of an AFM, the configuration of an AFM is described first hereafter.

Figure 1:
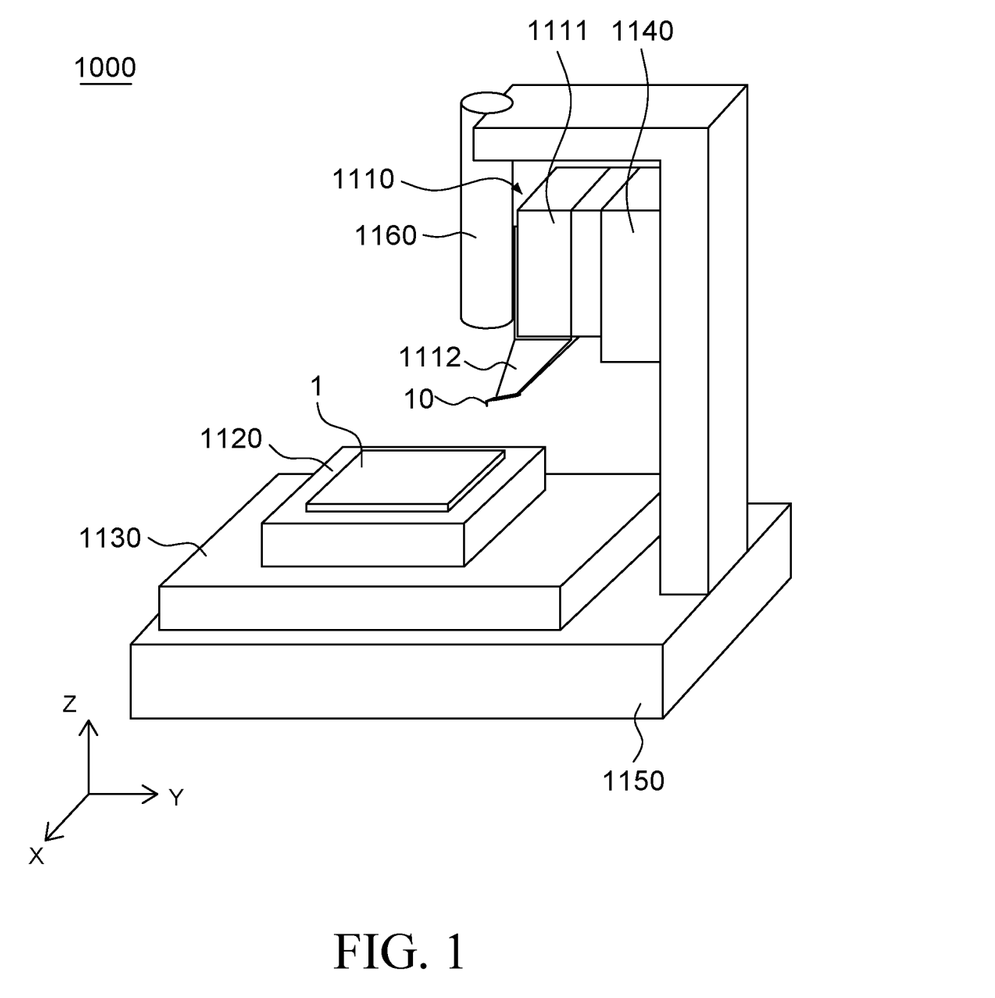
FIG. 1 is a schematic perspective view of an Atomic Force Microscope (AFM) with an XY-scanner and a Z-scanner separated.

FIG. 1 is a schematic perspective view of an Atomic Force Microscope (AFM) with an XY scanner and a Z scanner separated.

Referring to FIG. 1, an AFM 1000 is configured to include a head 1110, an XY-scanner 1120, an XY-stage 1130, a Z-stage 1140, a fixing frame 1150, and a vision device 1160.

The head 1110 includes a Z-scanner 1111 and a probe hand 1112. The Z-scanner 1111 moves the probe hand 1112 up and down, and a piezo stack may be used as an actuator. The probe hand 1112 transmits operation of the Z-scanner 1111 to a probe 10 fixed to the end thereof.

The XY-scanner 1120 is configured to scan a measurement target 1 in an X-direction and a Y-direction in an XY-plane. The XY-stage 1130 is configured to move the measurement target 1 and the XY-scanner 1120 with relatively large displacement in the X-direction and the Y-direction.

The Z-stage 1140 is configured to move the head 1110 with relative large displacement in a Z-direction. The fixing frame 1150 is configured to fix the XY-stage 1130 and the Z-stage 1140.

The vision device 1160 is configured to be able to enlarge and show the probe 10 or show the measurement target 1. The vision device 1160, though briefly shown in FIG. 1, includes a lens barrel, an objective lens, a light supplier, and a CCD camera, and is configured to receive light from the light supplier and changes an image enlarged by the objective lens to be visually recognized through the CCD camera such that the image may be shown by a separate display device. Details will be described with reference to FIG. 2.

The vision device 1160 may be fixed to the fixing frame 1150. However, unlikely, the vision device 1160 may be fixed by another member without being fixed to the fixing frame 1150.

The vision device 1160 is configured to be able to move on the Z-axis, and may show the probe 110 or the surface of a sample 1. That is, the focus of the vision device 1160 may be changed along the Z-axis.

This configuration corresponds to the configuration of a common AFM, and technical matters not included in the specification may be added with reference to the matters reflected to products such as commercialized NX10™ by Park Systems, Inc. that is the present applicant.

Figure 2:
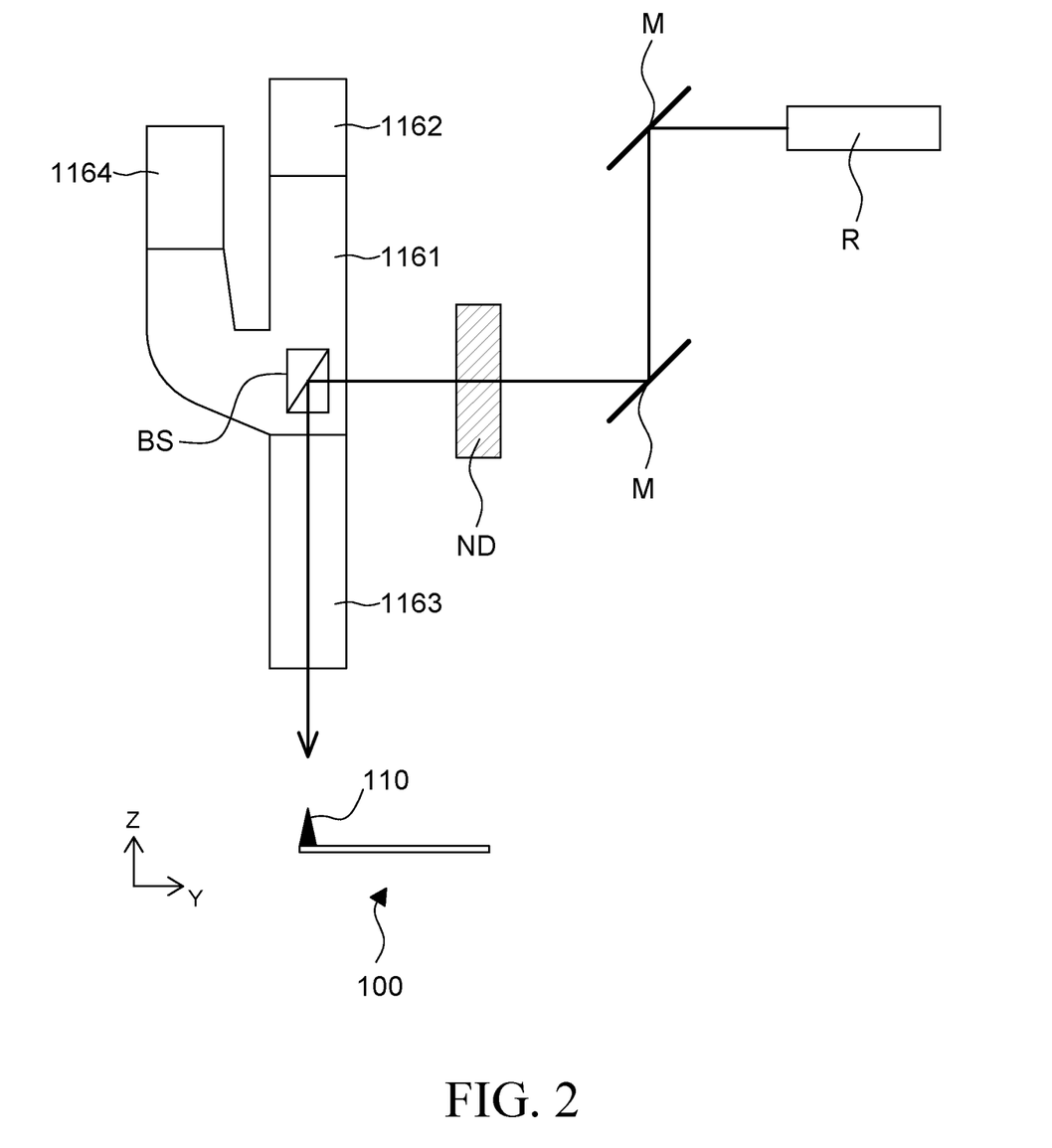
FIG. 2 is a conceptual view showing an optical system including a vision device from a side.
Figure 3A:
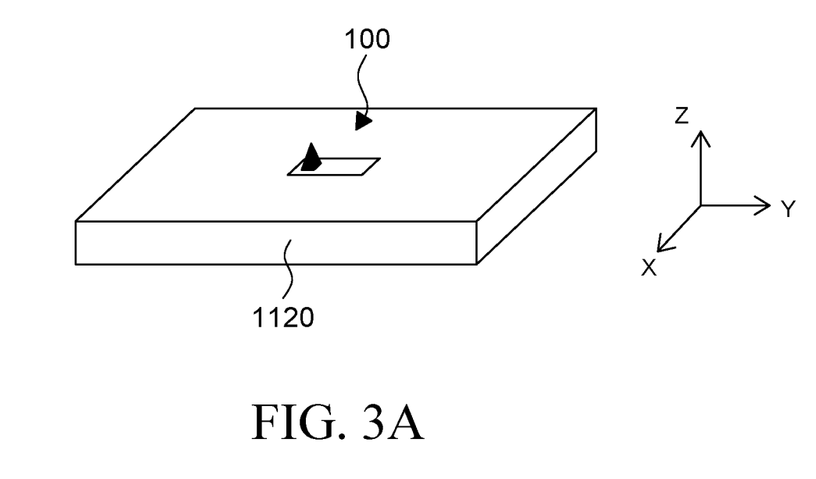
FIGS. 3A and 3B are views showing an example of a moving unit that moves a SThM probe.
Figure 3B:
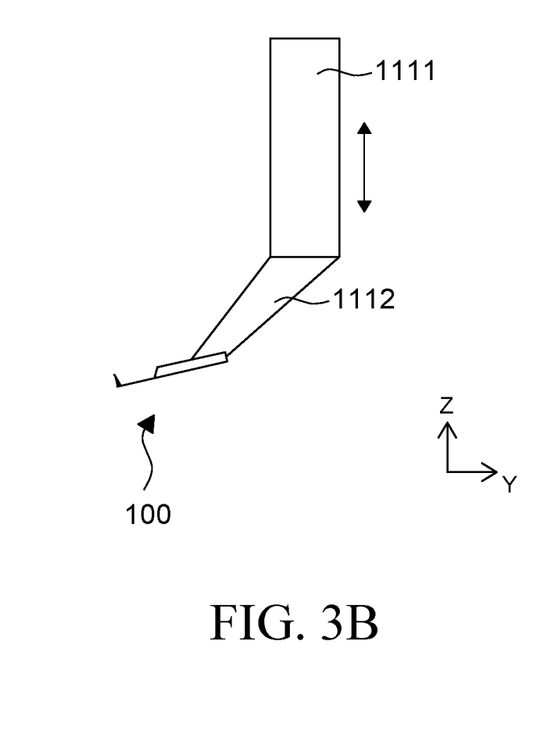

FIG. 2 is a conceptual view showing an optical system including a vision device from a side and FIGS. 3A and 3B are views showing an example of a moving unit that moves a SThM probe.

Referring to FIG. 2, an optical system 2000 is configured to include the vision device 1160 of FIG. 1.

The vision device 1160 is configured to include a lens barrel 1161, a CCD camera 1162, an objective lens 1163, and a lighting source 1164. The objective lens 1163 is connected to the bottom of the lens barrel 1161 and the CCD camera 1162 is connected to the top of the lens barrel 1161, so an image enlarged by the objective lens 1163 is formed in the CCD camera 1162. The lighting source 1164, for example, supplies white light to a side of the lens barrel 1161, thereby securing visibility of the CCD camera 1162. The vision device 1160 has the same configuration reflected to commercialized NX10™, etc. by Park Systems, Inc. that is the applicant.

Additional components other than the vision device 1160 are required to detect a beam spot of a light source R.

First, the light source R that is the target of measurement may be any type as long as it emits light, but a laser device that emits laser light is exemplified as the light source R in the description of this embodiment. In more detail, the light source R, which is a laser device regulated to form a beam spot, may be a He—Ne laser device having a wavelength of 633 nm.

The light from the light source R travels at least in a first direction (−z direction in FIG. 2). The light source R may directly emit light in the first direction, but the light source R hides the CCD camera, so it is preferable to change the ultimate traveling direction of the light into the first direction by arranging a plurality of mirrors M and a beam splitter BS, as shown in FIG. 2.

It is preferable that the beam splitter BS is installed in the lens barrel 1161 in this case. A neutral density filter ND may be disposed on the route of the light. The neutral density filter ND may perform a function of freely reducing the transmissive amount of light.

In FIG. 2, the light source R, the mirrors M, and the beam splitter BS function as an optical system that generates light and forms a beam spot.

The SThM probe 100 is positioned at a surrounding portion where a beam spot is formed with the end of the probe 110 facing substantially in the opposite direction to the first direction. Herein, the substantially opposite direction to the first direction means a direction that accurately the +Z direction in FIG. 2 and that the end of the probe 110 faces a direction within 30° from the opposite direction to the first direction. That is, the end of the probe 110 of the SThM probe 100 has only to face a beam spot to be able to sense a temperature change at the end of the probe 110.

The SThM probe 100 has been commercialized, so it is also called a SThM tip, and it is a probe for an AFM that may sense a temperature change T at the probe 110. In detail, as the SThM probe 100, a commercialized probe configured to change in resistance that is output in accordance with a temperature change may be used. For example, Therma-Lever Probe by ANASYS instrument, SThM_P by NT-MDT Spectrum Instruments, etc. may be freely used as the SThM probe 100.

The SThM probe 100 measures a temperature change of spaces while moving to the spaces. The SThM probe 100 may be moved by a moving unit.

The moving unit of the SThM probe 100 may be employed in various ways, but some of the components of the AFM 1000 may be employed, as shown in FIGS. 3A and 3B.

As shown in FIG. 3A, the XY-scanner 1120 may be employed as the moving unit. As shown in FIG. 3B, the Z-scanner 1111 and a probe arm 1112 may be employed as the moving unit.

When the XY-scanner 1120 is employed as the moving unit, it is possible to measure heat distribution in the XY-plane using the SThM probe 100. When the Z-scanner 1111 and a probe arm 1112 are employed as the moving unit, it is possible to measure heat distribution in the Z-direction using the SThM probe 100.

In order to detect the beam spot of the light source R using the configuration shown in FIG. 2, it is required only to check heat distribution in the XY-plane. Accordingly, it is preferable to employ the XY-scanner 1120 shown in FIG. 3A as the moving unit to detect the beam spot of the light source R.

Figure 4:
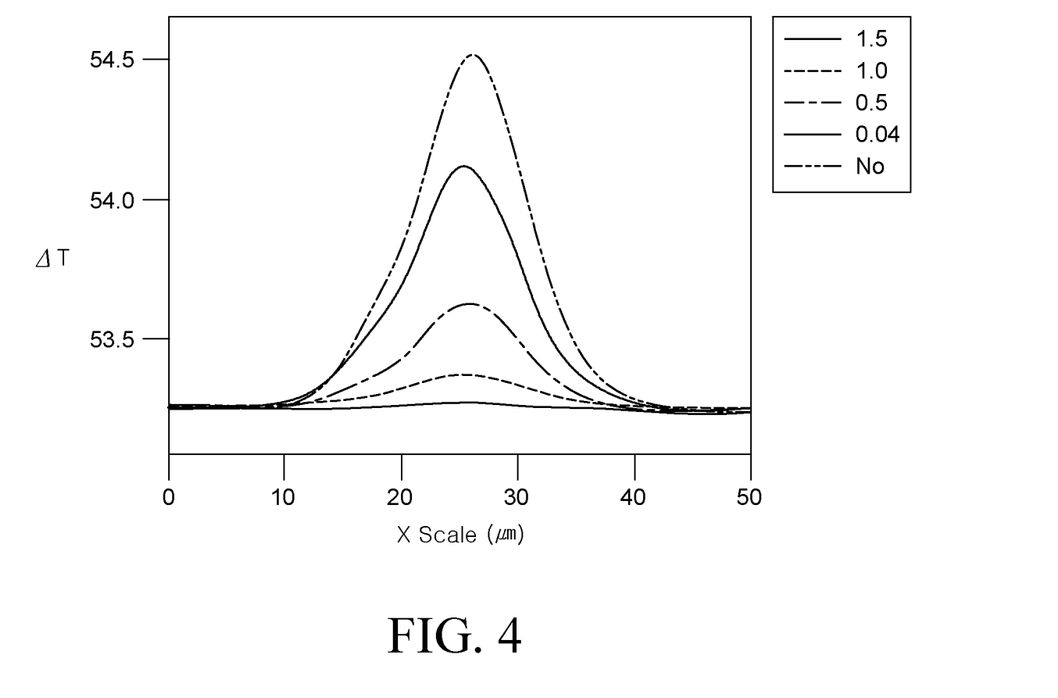
FIG. 4 is a graph showing X-directional heat distribution measured using a SThM probe while changing a neutral density filter of FIG. 2.

FIG. 4 is a graph showing X-directional heat distribution measured using a SThM probe while changing a neutral density filter of FIG. 2.

Referring to FIG. 4, when the neutral density filter ND is not used, it may be seen that a beam spot having heat distribution indicated by two-dot chain line was formed. Further, when the transmissivity of light is decreased by increasing a filter factor of the neutral density filter ND, it may also be seen that the center of the beam spot is maintained and the temperature decreases.

Accordingly, as shown in FIG. 4, a temperature change T is continuously measured during moving only by moving the SThM probe 100 in a space, and it is possible to obtain data about heat distribution of the space by accumulating and adding up the temperature changes. Accordingly, it is possible to detect the beam spot.

Receiving information from the SThM probe 100 and calculating a temperature change on the route of the SThM probe 100 are performed in a control device that is not shown. The control device may also perform a function of controlling movement of the moving unit. The control device may be integrated with the controller of the AFM 1000 described above.

Figure 5:
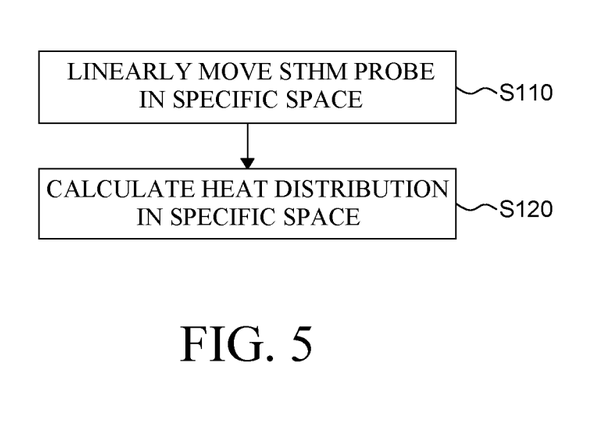
FIG. 5 is a flowchart showing a method of measuring heat distribution of a specific space.
Figure 6:
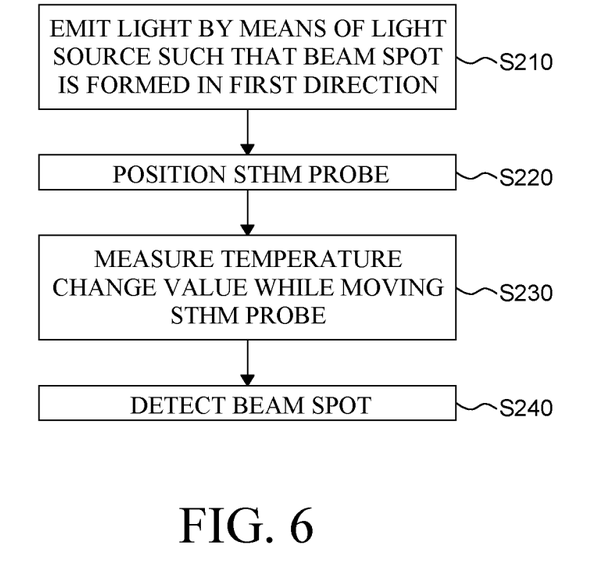
FIG. 6 is a flowchart showing a method of detecting a beam spot of a light source.

FIG. 5 is a flowchart showing a method of measuring heat distribution of a specific space and FIG. 6 is a flowchart showing a method of detecting a beam spot of a light source.

Referring to FIG. 5, a method of measuring heat distribution of a specific space includes: linearly moving the SThM probe 100 that may measure a temperature change in the specific space (S110); and calculating heat distribution of the specific space using continuous temperature change values obtained from the SThM probe 100 while the SThM probe 100 is moved (S120).

If the specific space is a space having a length in all of the X-direction, Y-direction, and Z-direction, it may be possible to divide the space into grids and set a route such that the probe 110 of the SThM probe 100 passes all of the grids. The SThM probe 100 passes the entire specific space and the temperature change values are continuously accumulated, whereby it is possible to map the heat distribution of the specific space.

Referring to FIG. 6, a method of detecting a beam spot of a light source includes: emitting light (S210); positioning the SThM probe (S220); measuring a temperature change value (S230); and detecting a beam spot (S240). This method was described above with reference to FIG. 2, but is described in detail again.

The emitting of light (S210) is a step of forming a beam spot by emitting light in the first direction by means of the light source R. The first direction is the −z-direction in FIG. 2.

The positioning of the SThM probe (S220) is a step of positioning the SThM probe 100 such that the end of the probe 110 of the SThM probe 100 is positioned at a surrounding portion where the beam spot is formed while facing a direction substantially opposite to the first direction. Referring to FIG. 2, the end of the probe 110 of the SThM probe 100 faces the +z-direction.

Here, the emitting of light (S210) may be performed after the positioning of the SThM probe (S220) is performed, and these two steps may be simultaneously performed.

Thereafter, temperature change value is measured while the SThM probe is moved in a direction substantially perpendicular to the first direction (S230). That is, the SThM probe 100 is moved in the XY-plane in FIG. 2. For example, the SThM probe 100 may be moved along the X-axis and may be moved along the Y-axis.

Here, the substantially perpendicular direction includes not only a direction completely perpendicular to the first direction (−z-direction), but a direction making an angle within ±10°. That is, it is the most preferable that the movement direction of the SThM probe 100 is completely perpendicular to the traveling direction of the light, but there is no problem in detection of the beam spot even if it is slightly inclined.

Thereafter, a beam spot is detected from the measured temperature change value (S240). It is possible to detect a beam spot by measuring temperature distribution, as shown in FIG. 4.

Although exemplary embodiments of the present disclosure were described above with reference to the accompanying drawings, those skilled in the art would understand that the present disclosure may be implemented in various ways without changing the necessary features or the spirit of the prevent disclosure. Therefore, the embodiments described above are only examples and should not be construed as being limitative in all respects.

What is claimed is:

1. A method of detecting a beam spot of a light source, the method comprising:
   emitting light in a first direction by means of the light source such that the beam spot is formed;
   positioning a SThM probe such that an end of a probe is positioned at a surrounding portion where the beam spot is formed while facing a direction substantially opposite to the first direction;
   measuring a temperature change value while moving the SThM probe in a direction substantially perpendicular to the first direction; and detecting the beam spot from the measured temperature change value.

2. A device for detecting a beam spot of a light source, the device comprising:

an optical system including a light source and configured such that light from the light source forms a beam spot at a specific point;

a SThM probe disposed such that an end of a probe faces a direction substantially opposite to a traveling direction of the light from the light source;

a moving unit configured to be able to move the SThM probe; and a control device controlling movement of the moving unit and calculating a temperature change on a route of the SThM probe on the basis of information from the SThM probe.

3. The device of claim 2, further comprising a CCD camera such that a shape of the beam spot may be visually recognized.

* * * * *